Aug. 16, 1938. H. S. CAMPBELL 2,127,105
AIRCRAFT SUSTAINING ROTOR
Filed May 25, 1937 3 Sheets-Sheet 1

INVENTOR
Harris S. Campbell
BY
Synnestvedt & Lechner
ATTORNEYS

Aug. 16, 1938.     H. S. CAMPBELL     2,127,105
AIRCRAFT SUSTAINING ROTOR
Filed May 25, 1937     3 Sheets-Sheet 3

INVENTOR
Harris S. Campbell
BY
Synnestvedt + Lechner
ATTORNEYS

Patented Aug. 16, 1938

2,127,105

UNITED STATES PATENT OFFICE 2,127,105

AIRCRAFT SUSTAINING ROTOR

Harris S. Campbell, Willow Grove, Pa., assignor to Autogiro Company of America, Willow Grove, Pa., a corporation of Delaware Application May 25, 1937, Serial No. 144,580

9 Claims. (Cl. 244—18)

This invention relates to aircraft sustaining rotors, and the invention is more particularly concerned with a rotor of the type adapted to be normally autorotationally actuated in flight and in which the several blades are pivoted to a common hub for independent swinging movements under the influence of flight forces.

One of the primary objects of the invention is to provide pivotal mountings for sustaining blades of the type mentioned affording freedom for pitch change movements of the blades under the influence of flight forces to accommodate or compensate for them, but which movements are opposed by the action of centrifugal force on the blades, so that a condition of equilibrium is always obtained between the moments tending to produce pitch change, and the restoring moments incident to the action of centrifugal force on the blades.

While accomplishing the foregoing, the blade pivot arrangements of this invention also serve to substantially eliminate bending moments in the blades.

Still further, it is an object of the invention to provide a novel type of blade articulation, structurally considered, whereby to effectively take care of friction and other loads on the blade pivots and also to simplify the mechanical parts employed in the blade mounting.

In accordance with another aspect of the invention provision is made for adjusting the angularity of the longitudinal blade axis with relation to the axis of at least one of the mounting pivots therefor.

How the foregoing and other objects and advantages are obtained, will be more apparent from a consideration of the following description referring to the accompanying drawings, in which—

Figure 1:
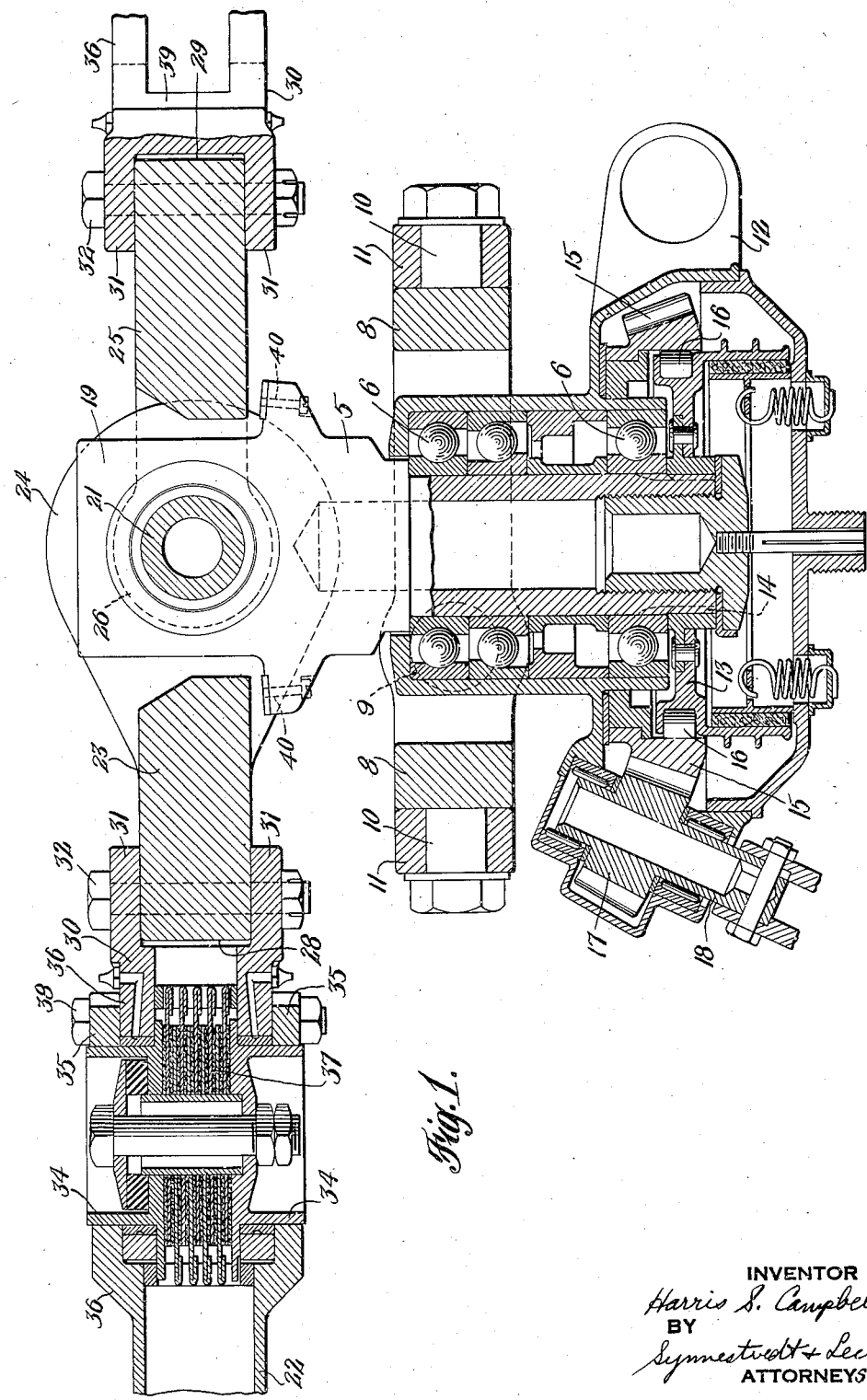
Figure 1 is a vertical sectional view through an aircraft sustaining rotor hub arranged to incorporate features of this invention, the section being taken substantially on the line 1—1 of Figure 2.

Referring first to Figure 1, the rotative hub spindle is shown at 5 as being journalled by means of bearings 6 in a housing 7 preferably mounted within a gimbal ring 8 as by means of trunnions 9. The ring 8 in turn is carried by means of trunnions 10 on the fixed support members 11 adapted to be mounted on structural members extended upwardly from the body of the craft. This mounting affords freedom for tilting movement of the rotor hub as a whole in all directions and the tilting movement may be controlled by suitable control elements connected with the hub, a connection for this purpose being shown at 12. By virtue of this mounting of the hub, control of the craft in flight may be obtained by tilting the hub through the control system, in the manner more fully described and claimed in the copending application of Juan de la Cierva, Serial No. 645,985, filed December 6, 1932.

Provision may also be made for driving the hub, such means in this instance including a flange member 13 secured to the hub spindle as by a spline 14, a ring gear 15 mounted peripherally of the flange member 13 and drivingly connected thereto by means of a series of rollers 16 forming an overrunning clutch. The gear 15 meshes with pinion 17 having a stub shaft 18 arranged for cooperation with another shaft extended downwardly to the body of the craft and preferably to the forward propulsion engine from which power is derived, desirably through a clutch, so that the rotor may be brought up to speed prior to take-off from the ground. The overrunning clutch 16, of course, ensures free overrunning of the rotor with respect to the drive during normal flight.

At its upper end the hub spindle 5 is provided with a horizontally apertured block 19 receiving bearings 20 which serve to journal the blade pivot pin or shaft 21.

Figure 2:
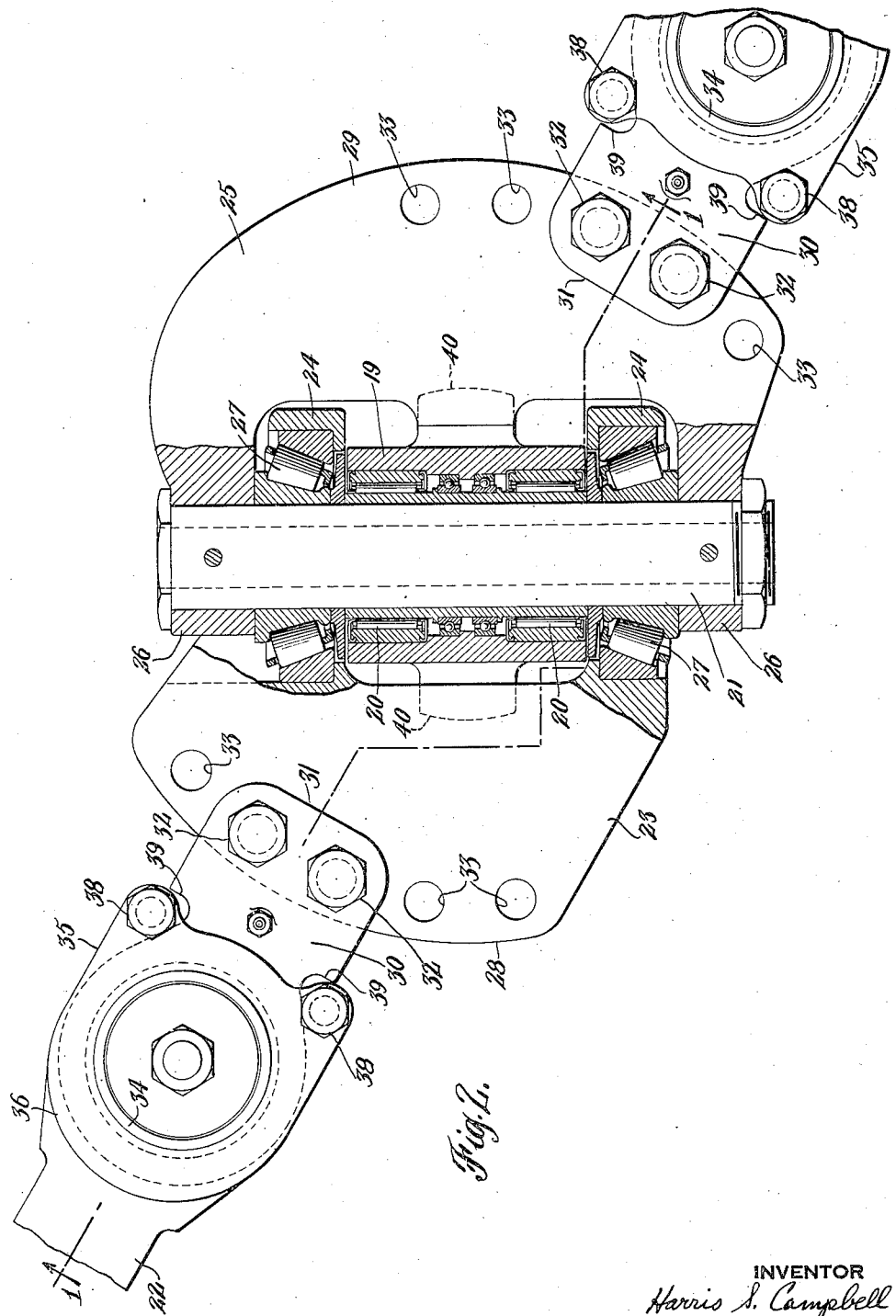
Figure 2 is a top plan view of the mechanism shown in Figure 1, with certain parts broken away and shown in horizontal section.

In the arrangement of Figures 1 and 2 the rotor incorporates two blades, fragments of the root end portions of which appear at 22, and these two blades are connected with or mounted on the pivot 21 by means of the mechanism now to be described.

At one side of the hub a blade mounting yoke 23 is provided, this yoke having a pair of prongs 24 which are spaced sufficiently to embrace the central hub block 19 and which are apertured to receive the pivot pin 21. For the other blade a similar yoke 25 is provided, the prongs 26 of this yoke being spaced sufficiently to embrace the prongs 24 for the first blade and apertured to receive the pivot pin 21.

To ensure freedom for independent movement of the two blades about the axis of pivot 21, bearings 27 are interposed between the pivot pin 21 and the apertured lugs 24 of the blade mounting member 23.

Each of the mounting members or yokes (23 and 25) is provided with a plate-like sector 28 and 29, respectively, to which a fitting 30 for the associated blade is adapted to be coupled. By reference to Figure 1 it will be seen that the fitting 30 has a pair of vertically spaced lugs 31—31 adapted to embrace the mounting yoke for that blade. The lugs 31 and the associated mounting are provided with apertures for the reception of securing bolts 32, and the sector of the mounting yoke is provided with a number of bolt receiving apertures (shown at 33) in excess of the number required for the two securing bolts 32—32. The several bolt holes 33 are angularly spaced about the axis of the rotor hub so as to provide for alternative attachment of the blade fitting 30 in a plurality of different angular positions.

The fitting 30 for each blade is connected with the root end portion thereof by means of a second articulation formed by means of pivot parts 34—34 received in an aperture in the part 30 and also projecting into apertures formed in the prongs 35—35 of the blade root fitting 36. The blade articulation parts just described also cooperate with a device generally indicated by the reference numeral 37, constituting a friction damper, in order to control swinging movement of the blade about the axis of the pivot 34—34. While it is of importance in accordance with this invention to employ an articulation of this type, i. e. a drag articulation with its axis preferably extended generally perpendicular to the blade axis, the details of the pivot structure and the damper structure 37 need not be considered herein since they form no part of the present invention per se. This mechanism is described and claimed in the copending application Serial No. 106,343 of Agnew E. Larsen, filed October 19, 1936.

In order to maintain angular movement of the blade about the drag articulation to a point within the range desirable in flight, cooperating limiting stops 38—38 (in the form of upright bolts) and 39—39 (in the form of abutment surfaces) may be provided. Similarly, in order to limit excessive downward droop of the blades, stop lugs 40 are advantageously provided on the hub part 5 in position to project outwardly and under an inner portion of the mounting yokes 23 and 25 for the blades.

Figure 3:
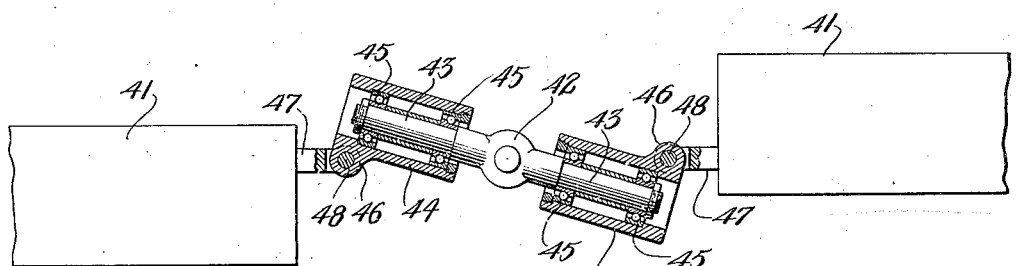
Figure 3 is a top plan view of a modified form of construction, also with parts in horizontal section.
Figure 4:
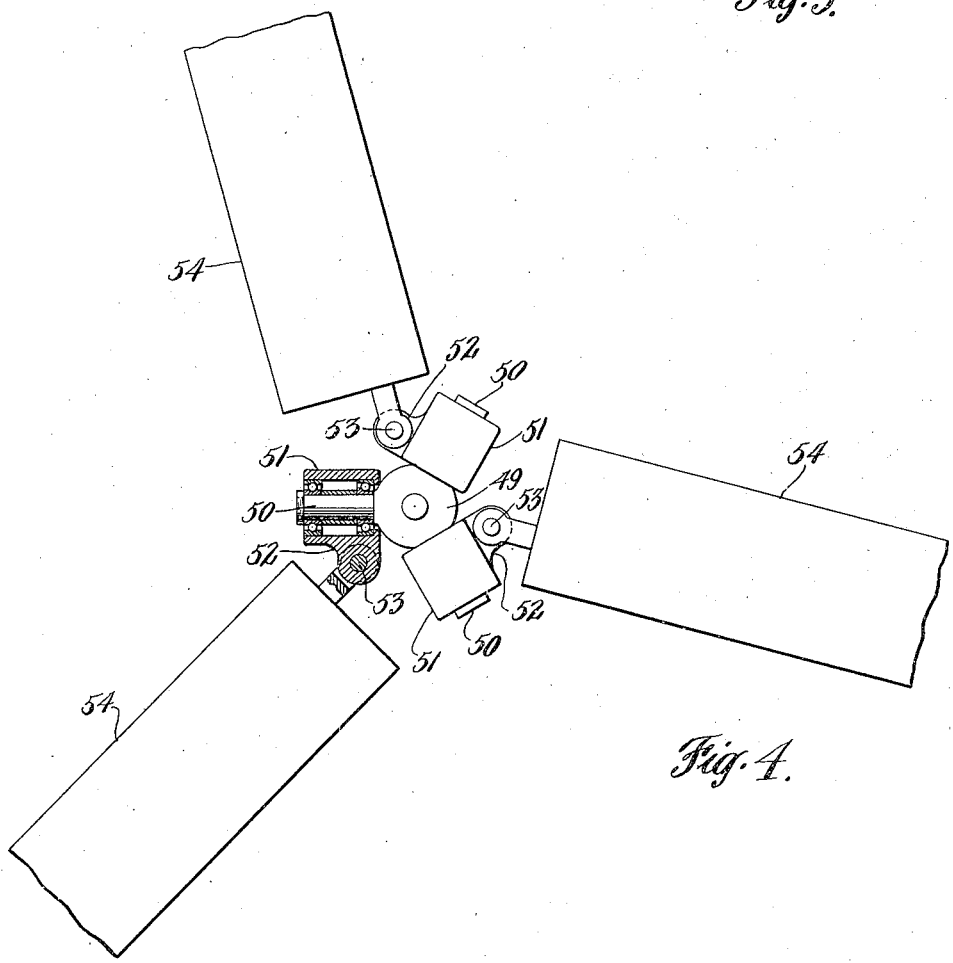
Figure 4 is a view similar to Figure 3 illustrating a further modified arrangement.

Before referring to the operation of the structure of Figures 1 and 2 described above, reference is made to the forms illustrated in Figures 3 and 4.

In Figure 3 an arrangement for a two-bladed rotor is also shown, the blades appearing at 41—41. In this form the central rotative hub member 42 is provided with a pair of oppositely disposed radial spindles 43—43 each of which serves to carry a blade 41. For this purpose a housing or sleeve 44 surrounds the spindle 43, suitable bearings 45 being interposed, and the housing 44 is provided with an apertured lug 46 which is embraced by the prongs of a fork fitting 47 provided at the root end of the blade 41. A pivot pin 48 connects the parts.

Similarly, in Figure 4, illustrating a three-bladed rotor, the hub 49 is provided with radial spindles 50, one for each blade, on which spindles housings 51 are mounted, these carrying appropriate lugs 52 for cooperation with the drag pivots 53 by means of which the blades 54 are attached.

In comparing Figures 3 and 4 it will be noted that there is a different angularity employed between the axes of the spindles 43 and the longitudinal blade axes. Attention is also called to the fact that in the arrangement of Figure 3, where the angle between the axis of pivot 43 and the longitudinal blade axis (at the leading edge of the blade) is small, the drag articulations are connected with the bearing housings 45 adjacent to the outer ends thereof. In contrast, in the arrangement of Figure 4, where three blades are employed, the angle between the axis of the pivotal mounting 50 and the longitudinal axis of the blade (at the leading edge thereof) is somewhat larger. In this arrangement the mounting lugs 52 for the drag articulations 53 are located toward the inner ends of the housings 51. In a three-bladed rotor this arrangement provides an unusually compact blade mounting, in addition to accomplishing other objects hereinbefore mentioned. Figure 3 also shows structure of a type resulting in unusual compactness, although it will be noted that in this form the parts are disposed so as to accomplish this purpose in a two-bladed rotor which, of course, presents different problems.

In all three structures, it is especially to be observed that the drag and flapping articulations are arranged with their axes lying in radial planes which are angularly offset from each other, with the radial plane of the flapping articulation something less than 90° ahead of the radial plane of the drag articulation with respect to the direction of rotation of the rotor. In all cases, therefore, provision is made for some pitch change movement of the blades to compensate for differential or other flight forces acting thereon, although the pivot arrangements are such that the pitch change movements of the blades are controlled by lift and centrifugal forces which oppose each other in a manner to produce the desired pitch changes for different conditions of flight. The foregoing is accomplished, moreover, in a manner which eliminates bending moments in the blades which would arise were the pitch change pivots arranged with their axes coincident with the longitudinal axes of the blades.

All embodiments illustrated also have in common, pivots arranged to accomplish the purposes just noted and further arranged with the flapping or pitch change articulation so located that its axis intersects the rotational axis of the hub, this being of considerable importance, especially in a rotor mounted for tilting movement, as by means of the gimbal ring 8 hereinbefore described.

In Figures 1 and 2, the structure makes provision for relative adjustment of the radial planes containing the axes of the drag and flapping articulations, so that this arrangement is more flexible, and consequently the same hub and blade mounting parts may be employed to mount blades of different aerodynamic characteristics. As clearly illustrated in Figure 2, the blade mounting yokes 23 and 25 may also be provided with bolt receiving apertures so located that the fittings 30 may be secured thereto in position to bring the axes of the drag articulations into radial planes which are perpendicular to the radial plane containing the axis of the flapping pivot 21.

In all cases it is preferred to have the axis of the drag articulation substantially perpendicular to the plane of the blade, so that, regardless of the position of the blade about the combined pitch change and flapping articulation, the drag movements of the blade always take place substantially in the plane thereof.

I claim:—

1. In an aircraft sustaining rotor having a hub and a blade, a mechanism for mounting the blade on the hub including a pivot having its axis oblique to the blade axis when viewed in plan and another pivot the axis of which is perpendicular to the blade axis, the two axes lying in radial planes angularly spaced from each other.

2. In an aircraft sustaining rotor having a hub and a blade, a mechanism for mounting the blade on the hub including a pivot having its axis oblique to the blade axis when viewed in plan and another pivot the axis of which is perpendicular to the blade axis, the two axes lying in radial planes angularly spaced from each other, which planes include an acute angle at the leading edge of the blade.

3. In an aircraft sustaining rotor having a hub and a blade, a pivot for connecting the blade to the hub, with the longitudinal blade axis substantially intersecting the hub axis, said pivot providing freedom for blade movement in response to flight forces thereon, and means for adjusting the relation of the longitudinal blade axis and the pivot axis without offsetting the longitudinal blade axis from the hub axis and means for fixing the blade and pivot in adjusted relation.

4. In an aircraft sustaining rotor having a hub and a blade, a pivot for connecting the blade to the hub, said pivot providing freedom for blade movement in response to flight forces thereon, means for relatively adjusting the relation of the longitudinal blade axis and the pivot axis including cooperating blade mounting fittings at least one of which is provided with a plurality of attachment means for the other adapted for alternative use, and said attachment means being angularly spaced from each other substantially about a center point lying on the hub axis.

5. In an aircraft, a hub, a sustaining blade extending radially of the hub, a pair of blade mounting parts one adapted to be connected with the blade and the other connected with the hub, and a pivot interconnecting said parts, the part adapted to be connected to the blade being provided with a plate-like portion having a plurality of attachment means to which the blade may alternatively be connected in a plurality of different radial positions, the several attachment means being angularly spaced from each other in a plane containing the axis of the pivot.

6. In an aircraft, a hub, a blade, and mechanism for mounting the blade on the hub including a yoke embracing at least a portion of the hub in a generally horizontal plane and having a plate sector lying substantially in said plane, a pivot interconnecting the yoke and the hub, and means for alternatively connecting the blade to said sector at different angular positions providing for relative adjustment of the pivot axis and the longitudinal blade axis.

7. In an aircraft, a sustaining rotor having a plurality of blades, a hub member having a plurality of spindles projecting radially therefrom, there being one spindle for mounting each blade, a blade mounting device surrounding and journalled on each of said spindles, and means for connecting a blade to the mounting device therefor in a plane angularly removed about the hub axis from the axis of the spindle.

8. In an aircraft, a sustaining rotor having a plurality of blades, a hub member having a plurality of spindles projecting radially therefrom, there being one spindle for mounting each blade, a blade mounting device surrounding and journalled on each of said spindles, and means horizontally offset to one side of each of said devices for connecting a blade thereto.

9. In an aircraft, a sustaining rotor, a hub member having a plurality of spindles projecting radially therefrom, a blade mounting device surrounding and journalled on each of said spindles, a plurality of blades, and a pivot for connecting a blade to each of said devices, said pivot having its axis extended generally transverse the plane of the blade and located in a position angularly removed about the hub axis from the axis of the spindle.

HARRIS S. CAMPBELL.